United States Patent [19]

Nowlin et al.

[11] Patent Number: 5,539,076
[45] Date of Patent: Jul. 23, 1996

[54] BIMODAL MOLECULAR WEIGHT DISTRIBUTION POLYOLEFINS

[75] Inventors: Thomas E. Nowlin, West Windsor; Sandra D. Schregenberger, Bridgewater; Pradeep P. Shirodkar, Somerset; Grace O. Tsien, Colonia, all of N.J.

[73] Assignee: Mobil Oil Corporation, Fairfax, Va.

[21] Appl. No.: 391,373

[22] Filed: Feb. 15, 1995

Related U.S. Application Data

[63] Continuation of Ser. No. 139,132, Oct. 21, 1993, abandoned.

[51] Int. Cl.$^6$ .................. C08F 10/02; C08F 210/02
[52] U.S. Cl. .................. 526/348.1; 526/114; 526/119; 526/348.2; 526/348.4; 526/348.5; 526/348.6; 526/352; 525/240; 525/247; 525/270
[58] Field of Search ............ 526/114, 348.1, 526/348.2, 348.4, 348.5, 348.6, 352, 119; 525/240, 247, 270

[56] References Cited

U.S. PATENT DOCUMENTS

| | | | |
|---|---|---|---|
| 4,048,412 | 9/1977 | Caumartin et al. | 526/65 |
| 4,307,209 | 12/1981 | Morita et al. | 525/246 |
| 4,336,352 | 6/1982 | Sakurai et al. | 525/240 |
| 4,338,424 | 7/1982 | Morita et al. | 526/65 |
| 4,352,915 | 10/1982 | Mashita et al. | 526/65 |
| 4,390,669 | 6/1983 | Morita et al. | 526/65 |
| 4,414,369 | 11/1983 | Kuroda et al. | 526/65 |
| 4,420,592 | 12/1983 | Kato et al. | 526/65 |
| 4,461,873 | 7/1984 | Bailey et al. | 525/240 |
| 4,481,301 | 11/1984 | Nowlin et al. | 502/104 |
| 4,481,302 | 11/1984 | McDaniel et al. | 502/150 |
| 4,525,322 | 6/1985 | Page et al. | 264/531 |
| 4,547,551 | 10/1985 | Bailey et al. | 525/240 |
| 4,603,173 | 7/1986 | Mack et al. | 525/194 |
| 4,703,094 | 10/1987 | Raufast | 526/65 |
| 4,888,318 | 12/1989 | Allen et al. | 502/105 |
| 4,918,038 | 4/1990 | Samuels et al. | 502/112 |
| 4,975,485 | 12/1990 | Sato et al. | 525/53 |
| 5,032,562 | 7/1991 | Lo et al. | 502/111 |
| 5,047,468 | 9/1991 | Lee et al. | 525/53 |
| 5,077,255 | 12/1991 | Welborn, Jr. | 502/104 |
| 5,126,398 | 6/1992 | Lee et al. | 525/53 |
| 5,145,818 | 9/1992 | Tsutsui et al. | 502/113 |

FOREIGN PATENT DOCUMENTS

| | | |
|---|---|---|
| 0369436 | 11/1989 | European Pat. Off. . |
| 59-179508 | 10/1984 | Japan . |
| 59-9179507 | 10/1984 | Japan . |

*Primary Examiner*—David W. Wu
*Attorney, Agent, or Firm*—Alexander J. McKillop; Malcolm D. Keen; Marina V. Schneller

[57] ABSTRACT

Resins which are in situ catalytically produced blends of broad bimodal molecular weight distribution ethylene resin are produced. The resins of the invention are characterized by a blend of low molecular weight component and high molecular weight component with HMW component weight fraction which is greater than 0 (zero). Generally, the LMW/HMW weight fraction can be controlled within a very broad range. The resin has a molecular weight distribution, which is characterized as MFR or Mw/Mn. The bimodal molecular weight resins can be processed into films on existing equipment, and exhibit good processability in blown film production and provide film product of excellent FQR. The resin of the invention exhibits reduced tendency towards die-lip buildup and smoking in on-line operations.

23 Claims, 1 Drawing Sheet

BIMODAL MOLECULAR WEIGHT DISTRIBUTION POLYOLEFINS

This is a continuation of application Ser. No. 08/139,132, filed on Oct. 21, 1993, now abandoned.

FIELD OF THE INVENTION

The invention relates to a catalytically produced blend comprising a high molecular weight component and low molecular weight component. These blends may be characterized as exhibiting bimodal or broad molecular weight distribution. The blend comprises polymers and copolymers of ethylene and admixtures thereof. The catalyst which is used contains two different transition metals. The catalyst allows for the production of the blend in a single reactor. The resulting blends embrace a broad spectrum of product compositions, determined by the weight fractions and molecular weights of the individual components. The blends can be processed into films of excellent appearance, exhibiting very low gel levels.

BACKGROUND OF THE INVENTION

Bimodal molecular weight distribution of a resin indicates that a resin comprises to components of different molecular weight, and implicitly requires a relatively higher molecular weight component (HMW) and low molecular weight (LMW) component. Physical blending of two different polymers will produce a bimodal blend. Such a concept appears in U.S. Pat. No. 4,461,873. Those physically produced blends contain high gel levels. Accordingly, their actual application in film production is of theoretical interest only because of film appearance due to those gels.

To replace physical blending, the art shows a development by which such bimodal resin blends are produced by process techniques, sometimes referenced as tandem process polymerization. Such a process relies on a two (or more) reactor set up; in one reactor, one of the two components of the bimodal blend is produced under a set of conditions maintained in the first reactor, and transferred to a second reactor, where under a different set of conditions from those in the first reactor the second component is produced, with a different molecular weight. Compared to bimodal HMW- high density polyethylene [HMW HDPE] produced by physical blending, blends produced in a tandem operation may have relatively improved film appearance. However, the film appearance is dependent on the HMW component being a major component, greater than 50 percent by weight fraction, of the blend. U.S. Pat. No. 4,307,209 discusses some of the constraints on composition which the tandem mode of operation imposes on product because of the presence of gels.

The problems which inhere in tandem produced products, as discussed in U.S. Pat. No. 4,307,209, may be due to a function of particles of product which have varying LMW/HMW ratios. It is difficult to avoid having particles that have not incorporated LMW species, particularly, when the HMW component is produced in the first reactor. This may be due to deactivation of the HMW reactor particles or because of their bypassing the LMW reactor. Such particles with fairly high viscosity appear as gels and would be incorporated (through deformation) only if the bulk matrix viscosity was high enough. The latter requires that the weight fraction of the HMW component be fairly high (greater than 55 percent).

The desirability of bimodal products resides in product strength and processability, which are provided by the individual components of the blend. Processability relates to the capacity of the resin to be used in existing lines efficaciously.

SUMMARY OF THE INVENTION

In accordance with the invention, broad, and preferably bimodal molecular weight distribution ethylene resin is produced catalytically; moreover, the catalysis can be conducted in one reactor. As a result of catalysis in a single reactor the product has greatly improved inter particle composition homogeneity. This is because the catalyst itself provides sites for catalysis of each of the LWM and HWM component, in the constant process conditions and environment of one reactor. Since these sites are relatively uniform in concentration in the catalyst particle, the polymerization (or copolymerization) product particles will have substantially constant HMW:LMW ratios. This means that the Mw and the Mw/Mn of said resin in said particles is substantially constant over the range of weight average particle diameter of the particles.

The resins of the invention are characterized by a chemical blend of low molecular weight component and a high molecular weight component with the HMW component weight fraction being greater than 0 (zero). Generally, the HMW component weight fraction can be controlled within a very broad range. The resin has a molecular weight distribution, which is characterized as MFR or Mw/Mn. MFR is the ratio I21/I2 [determined by ASTM 1238]. Mw is weight average molecular weight and Mn is number average molecular weight as determined by Gel Permeation Chromatography (GPC).

The resins which are (broad) bimodal molecular weight resins can be processed into films on existing equipment, and exhibit good processability, in blown film production and provide film product with a low gel level (excellent FQR). The resin of the invention exhibits reduced tendency towards die-lip buildup and smoking in on-line operations. The resin of the invention exhibits these unexpected advantages over a broader range of HMW/LMW composition than that produced by either physical blends or tandem series reactor technology.

DETAILED DESCRIPTION OF THE INVENTION

Figure 1:
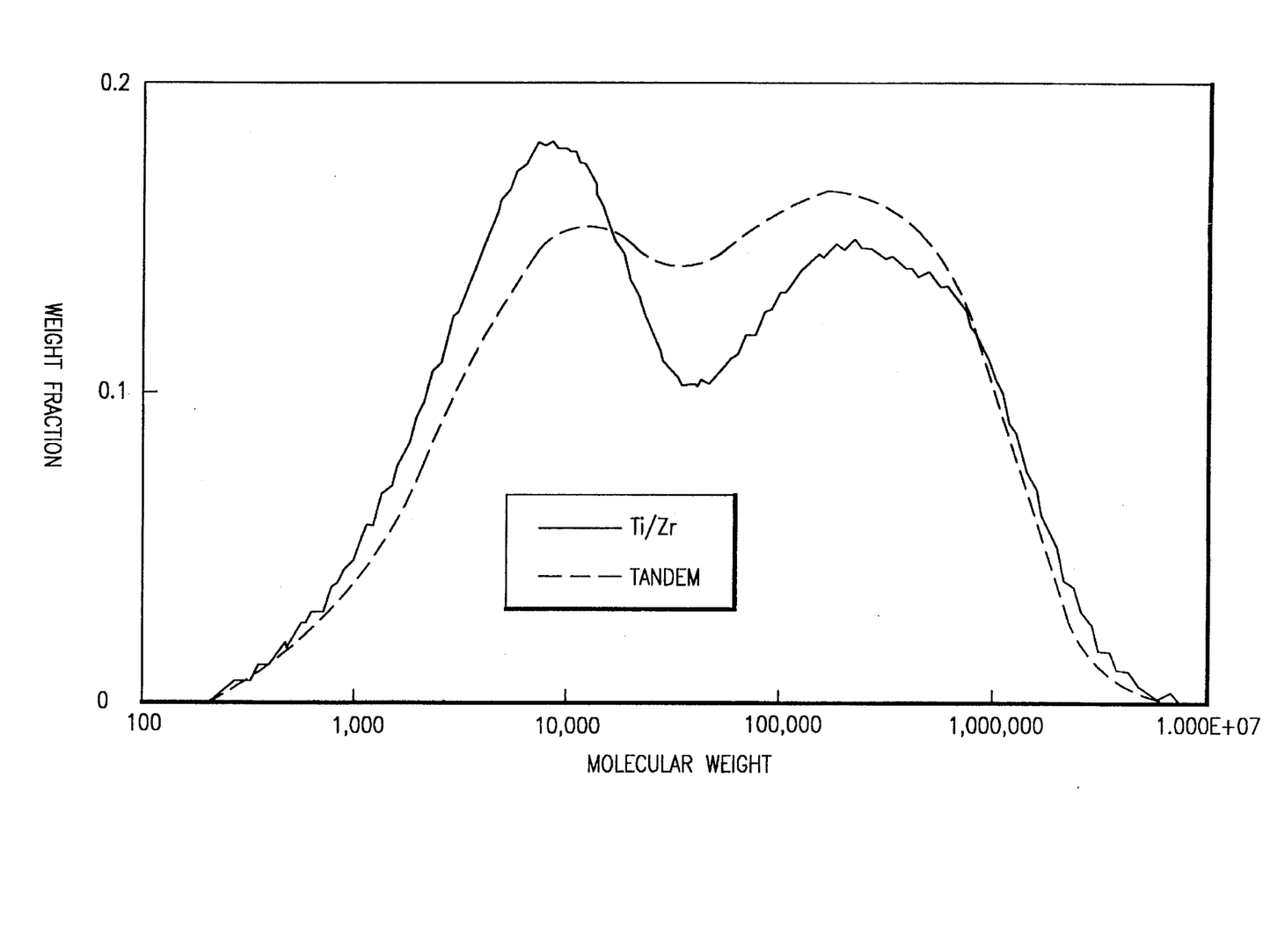
The FIGURE is a GPC [gel permeation chromatograph] curve of a resin of the invention.

The resins herein are mainly comprised of ethylene. The resins may be homopolymers, copolymers or admixtures of homopolymers and copolymers. Copolymers of ethylene contain at least 70 weight percent ethylene and an alpha olefin of 3 to 10 carbon atoms. Preferred alpha olefins include 1-butene, 1-hexene, 1-octene and 4 methyl-pentene.

The resins produced herein have a specific density in the range of 0.89 to 0.970. The resins which can be produced in accordance with the invention can exhibit densities of high density, medium density or low density resins, respectively. Accordingly, the resins can be produced which exhibit specific density in the range of 0.89 to 0.929 [low density], 0.930 to 0.940 [medium density], and 0.940 to 0.970 [high density.]

The resins of the invention are characterized by a blend of HMW and LMW component with the high molecular weight component weight fraction which is greater than 0 (zero). Generally, the HMW component weight fraction can be controlled within a very broad range, while maintaining excellent properties in ultimate applications, such as film production. The weight fraction of HMW component can range from 0.01 to 0.99, preferably from 0.4 to 0.7 and most preferably from 0.5 to 0.6. The resin has a molecular weight distribution, which is characterized as MFR or Mw/Mn. The MFR of resin products of the invention can range from 20 to 300, preferably from 60 to 200, and most preferably from 80 to 150. The Mw/Mn of resin products of the invention can range from 2.5 to 60, preferably from 10 to 40, and most preferably from 15 to 30.

The MFR of the low molecular weight component of the resin products of the invention can range from 15 to 40, preferably from 15 to 30, and most preferably from 15 to 20. The Mw/Mn of the low molecular weight component of the resin products of the invention can range from 2 to 30, preferably from 2 to 3.5, and most preferably from 2 to 2.5. The low molecular weight component of resin product of the invention is much narrower in molecular weight distribution, than that produced by a conventional Ziegler Natta catalyst containing only one transition metal such as titanium and/or that produced by a conventional tandem two-reactor process. The narrow MWD of the LMW component is a result of the single site metallocene catalyst component. This narrower molecular weight distribution of the low molecular weight component of the resin of the invention may be responsible for the reduced tendency towards die-lip buildup and smoking because of the absence of very low molecular weight tails. That narrower distribution also enables production of much lower molecular weight component, as the LMW component, without encountering the die-lip buildup problem. The MFR of the high molecular weight component of the resin products of the invention can range from 25 to 90, preferably from 30 to 50, and most preferably from 30 to 40. The Mw/Mn of the high molecular weight component of the resin products of the invention can range from 3 to 30, preferably from 3 to 10, and most preferably from 3 to 6.

The molecular weight of the LMW component as reflected and expressed herein as MI [ASTM D1238 (190° C./2160 g)] can range generally from 0.1 to 20,000, usually from 20 to 20000, preferably 100 to 5000, and most preferably 2000 to 3000. The FI [ASTM D1238 (190° C./21600 g)] of the high molecular weight component can range from 0.005 to 50, preferably from 0.1 to 5 and most preferably from 0.2 to 1.0.

The resin product of the invention is unsaturated and crosslinkable. The resin product of the invention has an unsaturation measured by IR which ranges from 0.1 to 3.0, generally 0.20 to 3.0, preferably ranges from 0.2 to 2 and most preferably ranges from 0.4 to 1.5 (unsaturation per 1000 carbon atoms). The high levels of unsaturation allow for facile cross-linking of resin products of the invention.

When blown into films, these resins exhibit unexpected FQR values. FQR is a qualitative ranking of gel level, ranging from 10 to 60, where 10 FQR indicates no gels and 60 FQR indicates an unacceptably high number of gels. As noted below in the Examples, the FQR of resin products of the invention is superior to those of tandem process produced resins. Generally, the FQR is less than 50, usually less than 30, preferably less than 20 and most preferably 10. In addition to excellent FQR values, the products exhibit excellent dart drop impact resistance.

The resin products of the invention can be referred to as in situ catalytically produced blends of bimodal molecular weight distribution. As noted above, the resins are produced by a catalyst which comprises two different transition metals. In a preferred embodiment at least one of the transition metals is provided in the form of a metallocene compound. In a preferred embodiment at least one of the transition metals is provided in the form of a metallocene compound of a transition metal zirconium or hafnium. Accordingly, the resin product of the invention will contain 0.01 to 10 ppm usually 1 to 5, and generally 1 to 3 ppm (weight of the transition metal (e.g. Hf, Zr, Ti) which is provided in the catalyst as the metallocene. It will contain 1 to 30 ppm titanium, preferably 1 to 20, and more preferably 1 to 10 ppm titanium provided as a non-metallocene or as $TiCl_4$.

The preferred catalysts comprise a cocatalyst comprising an aluminum alkyl compound, such as a trialkyl aluminum free of alumoxane, e.g. TMA, and a catalyst precursor comprising a carrier, an alumoxane, at least one metallocene and a non-metallocene transition metal source.

The carrier material is a solid, particulate, porous, preferably inorganic material, such as an oxide of silicon and/or of aluminum. The carrier material is used in the form of a dry powder having an average particle size of from about 1 micron to about 250 microns, preferably from about 10 microns to about 150 microns. The surface area of the carrier is at least about 3 square meters per gram ($m^2$/gm), and preferably at least about 50 $m^2$/gm up to about 350 $m^2$/gm. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmols/gm). The silica of the most preferred embodiment is a high surface area, amorphous silica (surface area= 300 $m^2$/gm; pore volume of 1.65 $cm^3$/gm), and it is a material marketed under the tradenames of Davison 952 or Davison 955 by the Davison Chemical Division of W.R. Grace and Company. The silica is in the form of spherical particles, e.g., as obtained by a spray-drying process.

When the catalyst contains two transition metals components, one of which is a metallocene, and one of which is non-metallocene (free of unsubstituted or substituted cyclopentadienyl groups) the impregnation of the alumoxane in accordance with the unique method described above is preferably undertaken after hydroxyl groups of the carrier material are reacted with an organomagnesium compound and the non-metallocene transition metal compound. In this embodiment, the amount of Al, provided by alumoxane, is sufficient to provide an Al:transition metal (provided by metallocene) mole ratio ranging from 50 to 500, preferably 75 to 150. The carrier material, having said (OH) groups, is slurried in a non-polar solvent and the resulting slurry is contacted with at least one organomagnesium composition having the empirical formula below. The slurry of the carrier material in the solvent is prepared by introducing the carrier into the solvent, preferably while stirring, and heating the mixture to about 25° to about 70° C., preferably to about 40° to about 60° C. Temperatures here are critical with respect to the non-metallocene transition metal which is subsequently added; that is temperatures in this slurry of about 90° C. result in deactivation of the transition metal added subsequently. The slurry is then contacted with the aforementioned organomagnesium composition, while the heating is continued at the aforementioned temperature.

The organomagnesium composition has the empirical formula $$R_mMgR'_n$$

where R and R' are the same or different $C_2$–$C_{12}$ alkyl groups, preferably $C_4$–$C_{10}$ alkyl groups, more preferably $C_4$–$C_8$ normal alkyl groups, and most preferably both R and R' are n-butyl groups, and m and n are each 0, 1 or 2, providing that m+ n is equal to the valence of Mg.

Suitable non-polar solvents are materials in which all of the reactants used herein, i.e., the organomagnesium composition, and the non-metallocene transition metal compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals and precipitate outside of the support. The carrier drying temperature affects the number of sites on the carrier available for the organomagnesium composition—the higher the drying temperature the lower the number of sites. Thus, the exact molar ratio of the organomagnesium composition to the hydroxyl groups on the carrier will vary and must be determined on a case-by-case basis to assure that only so much of the organomagnesium composition is added to the solution as will be deposited onto the support without leaving any excess of the organomagnesium composition in the solution. Furthermore, it is believed that the molar amount of the organomagnesium composition deposited onto the support is greater than the molar content of the hydroxyl groups on the support. Thus, the molar ratios given below are intended only as an approximate guideline and the exact amount of the organomagnesium composition in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected as a solution in the solvent.

For example, for the silica carrier heated at about 600° C., the amount of the organomagnesium composition added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium composition dissolves in the non-polar solvent to form a solution from which the organomagnesium composition is deposited onto the carrier.

It is also possible to add such an amount of the organomagesium composition which is in excess of that which will be deposited onto the support, and then remove, e.g., by filtration and washing, any excess of the organomagnesium composition. However, this alternative is less desirable than the most preferred embodiment described above.

After the addition of the organomagnesium composition to the slurry is completed, the slurry is contacted with a non-metallocene transition metal compound, free of substituted or unsubstituted cyclopentadienyl groups. The slurry temperature must be maintained at about 25° to about 70° C., preferably to about 40° to about 60° C. As noted above, temperatures in this slurry of about 80° C. or greater result in deactivation of the non-metallocene transition metal. Suitable non-metallocene transition metal compounds used herein are compounds of metals of Groups IVA, and VA, of the Periodic Chart of the Elements, as published by the Fisher Scientific Company, Catalog No. 5-702- 10, 1978, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of titanium or vanadium, in non-metallocene form ranges from a Ti/Mg molar ratio of 0.5 to 2.0, preferably from 0.75 to 1.50.

Mixtures of such non-metallocene transition metal compounds may also be used and generally no restrictions are imposed on the transition metal compounds which may be included. Any transition metal compound that may be used alone may also be used in conjunction with other transition metal compounds.

Incorporation of the alumoxane-metallocene can be directly to this slurry. Alternatively, and in accordance with the unique method of infusion of alumoxane into the pores of the carrier, the carrier slurry can be stripped of solvent, after the addition of the non-metallocene transition metal compound, to form a free-flowing powder. The free flowing powder can then be impregnated by determining the pore volume of the carrier and providing a metallocene-alumoxane solution in a volume equal to or less than that of the pore volume of the carrier, and recovering a dry catalyst precursor. The amount of solution of aluminoxane activated zirconocene is to obviate the formation of a slurry containing the silica supported titanium in the solution of the activated zirconocene; the actual volume of solution (of activated zirconocene) can be 30% greater than the total pore volume of silica supported titanium without slurry formation.

The resulting free-flowing powder, referred to herein as a catalyst precursor, is combined with an activator (sometimes referred as a cocatalyst). The activator is a monomeric anhydrous aluminum compound. The aluminum compound can be a trialkylaluminum, dialkylaluminum hydride, dialkylaluminum halide, alkylaluminum dihydride or alkylaluminum dihalide, in which alkyl is 1 to 6 carbon atoms, methyl, ethyl, propyl, isopropyl, butyl, isobutyl, straight and branched pentyl and hexyl groups. Specific examples include triethylaluminum, triisobutylaluminum and trimethylaluminum. The amount of cocatalyst is sufficient to activate the precursor containing the non-metallocene source of transition metal. Practically, the amount of activator (or cocatalyst) ranges from 80 to 800 ppm, preferably from 200 to 300 ppm, based on the ethylene feed. Preferably, trimethylaluminum (TMA) is the cocatalyst or activator. The amount of the TMA activator is sufficient to give an Al:Ti molar ratio of about 10:1 to about 1000:1, preferably about 15:1 to about 300:1, and most preferably about 20:1 to about 100:1. The catalyst exhibits high activity for long periods of time and exhibits little deactivation.

In a preferred embodiment, the metallocene is added to a solution of the alumoxane prior to impregnating the non-metallocene transition metal supported carrier with the solution. The class of alumoxanes comprises oligomeric linear and/or cyclic alkylalumoxanes represented by the formula: $R-(Al(R)-O)_n-AlR_2$ for oligomeric, linear alumoxanes and $(-Al(R)-O-)_m$ for oligomeric cyclic alumoxane wherein n is 1–40, preferably 10–20, m is 3–40, preferably 3–20 and R is a $C_1-C_8$ alkyl group and preferably methyl (MAO). It is a mixture of oligomers with a very wide distribution of molecular weights and usually with an average molecular weight of about 1200. MAO is typically kept in solution in toluene. While the MAO solutions remain liquid at fluid bed reactor temperatures, the MAO itself is a solid in the absence of toluene.

Again the maximum volume of the alumoxane solution also including the metallocene is the total pore volume of the carrier material sample. That maximum volume of the alumoxane solution insures that no slurry of silica is formed. Accordingly, if the pore volume of the carrier material is 1.65 cm$^3$/g, then the volume of alumoxane will be equal to or less than 1.65 cm$^3$/gram of carrier material. As a result of this proviso, the impregnated carrier material will appear dry immediately following impregnation although the pores of the carrier will be filled with inter alia solvent. The mole ratio of alumoxane provided aluminum, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at a temperature of about 20° to 80° C., for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters, preferably it is toluene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight-chain $C_1-C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as $-CH_2-$, $-CH_2-CH_2-$, $-CR'R''-$ and $-CR'R''-CR'R''-$ where R' and R'' are short alkyl groups or hydrogen, $-Si(CH_3)_2-$, $Si(CH_3)_2-CH_2-CH_2-Si(CH_3)_2-$ and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1-C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1-C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride. The metallocene compounds utilized within the embodiment of this art can be used as crystalline solids, as solutions in aromatic hydrocarbons or in a supported form.

Solvent may be removed from the alumoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° and below about 50° to obviate agglomeration of catalyst particles and cross-linking of the alumoxane. Although solvent can be removed by evaporation at relatively higher temperatures than that defined by the range above 40° and below about 50° C., very short heating times schedules must be employed to obviate agglomeration of catalyst particles and cross-linking of the alumoxane.

POLYMERIZATION

The catalyst composition of this invention is used to polymerize either ethylene alone or ethylene in conjunction with higher monomers, such as any one of $C_3-C_{10}$ alpha-olefins, e.g., propylene, 1-butene, 1-pentene, 1-hexene, 4-methyl-1-pentene, 1-heptene or 1-octene, preferably 1-butene, 1-pentene, 1-hexene or 4-methyl-1-pentene and most preferably 1-hexene. The polymerization reaction may be carried out using any suitable, conventional olefin polymerization process, such as a slurry, particle form or vapor phase, e.g., fluid bed reactor, but preferably it is carried out in a vapor phase, fluid bed reactor. The reaction is conducted substantially in the absence of catalyst poisons, such as moisture, carbon monoxide and acetylene, with a catalytically effective amount of the catalyst at a temperature and pressure conditions sufficient to initiate the polymerization reaction. A particularly desirable method for producing polymers according to the present invention is in a fluid bed reactor. Such a reactor and means for operating it are described by Levine et al. U.S. Pat. No. 4,001,382, Karol et al., U.S. Pat. No. 4,302,566, and Nowlin et al, U.S. Pat. No. 4,481,301, the entire contents of all of which are incorporated herein by reference. The polymer produced in such a reactor contains catalyst particles since the catalyst is not separated from the polymer.

In order to achieve density ranges of about 0.915 to about 0.965 g/cc in the copolymers, it is necessary to copolymerize enough of the $C_3$ or higher comonomer with ethylene to achieve a level of about 0.1 to about 25 mole percent of the $C_3$–$C_{10}$ comonomer in the copolymer. The amount of comonomer needed to achieve this result will depend on the particular comonomer(s) being employed. Further, the various intended comonomers have different reactivity rates, relative to the reactivity rate of ethylene, with respect to the copolymerization thereof with the catalysts of the present invention. Therefore, the amount of comonomer used in the stream of monomers fed to the reactor will also vary depending on the reactivity of the comonomer.

In the most preferred embodiment, the catalyst of the present invention is used to polymerize 1-hexene and ethylene to obtain polymers having the density of about 0.930 to about 0.955 g/cc, and high load melt index (HLMI), $I_{21}$, values of about 3 to about 12, preferably about 6 to about 8, which are especially suitable for the production of high strength films.

Hydrogen may be used in the polymerization reaction of the present invention in such amounts that the ratio of hydrogen to ethylene is between about 0 to about 2.0 moles of hydrogen per mole of the ethylene monomer in the gas stream. Any gas inert to the catalyst and reactants may also be present in the feed stream.

CONDITIONS IN THE FLUID BED REACTOR FOR THE GAS PHASE POLYMERIZATION AND COPOLYMERIZATION OF ETHYLENE

It is essential to operate the fluid bed reactor at a temperature below the sintering temperature of the polymer particles. For the production of ethylene copolymers in the process of the present invention an operating temperature of about 30° to 115° C. is preferred, and a temperature of about 75° to 100° C. is most preferred. Temperatures of about 70° to 85° C. are used to prepare products having a density of about 0.89 to 0.930, and temperatures of about 80° to 95° C. are used to prepare products having a density of about 0.93 to 0.94, and temperatures of about 90° to 115° C. are used to prepare products having a density of about 0.94 to 0.96.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a point above the distribution plate at a rate equal to its consumption. Since the catalysts used in the practice of this invention are highly active, injection of the fully activated catalyst into the area below the distribution plate may cause polymerization to begin there and eventually cause plugging of the distribution plate. Injection into the bed, instead, aids in distributing the catalyst throughout the bed and precludes the formation of localized spots of high catalyst concentration.

The production rate of polymer in the bed is controlled by the rate of catalyst injection. Since any change in the rate of catalyst injection changes the rate of generation of the heat of reaction, the temperature of the recycle gas is adjusted to accommodate the change in rate of heat generation. Complete instrumentation of both the fluidized bed and the recycle gas cooling system is, of course, necessary to detect any temperature change in the bed so as to enable the operator to make a suitable adjustment in the temperature of the recycle gas.

Since the rate of heat generation is directly related to product formation, a measurement of the temperature rise of the gas across the reactor (the difference between inlet gas temperature and exit gas temperature) is determinative of the rate of particulate polymer formation at a constant gas velocity.

Under a given set of operating conditions, the fluidized bed is maintained at essentially a constant height by withdrawing a portion of the bed as product at a rate equal to the rate of formation of the particulate polymer product.

The compositions of the invention can be extruded and injection or blow molded into articles or extruded and blown into films. Films can be produced which are 0.2 to 5.0 mils, preferably 0.5 to 2.0 mils, thickness. Blow molded articles include bottles, containers, fuel tanks and drums.

A particularly desirable method for producing linear low density polyethylene polymers according to the present invention is in a single fluid bed reactor unit which is shown and is also described in U.S. Pat. No. 4,481,301, which is relied upon and incorporated by reference herein.

For film production, the products may contain any of various additives conventionally added to polymer compositions such as lubricants, microtalc, stabilizer, antioxidants, compatibilizers, pigments, etc. These reagents can be employed to stabilize the products against oxidation. For example, additive packages comprising 400–1200 ppm hindered phenol(s); 200–2000 ppm phosphites; 250 to 1000 ppm antistats and 250–2000 ppm stearates, for addition to the resin powders, can be used for pelletization. The polymers can be added directly to a blown film extruder, e.g., an Alpine extruder, to produce films having a thickness, for example of about 0.2 to 5 mils.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - a plaque is made and conditioned for one hour at 100° C. to approach equilibrium crystallinity. Measurement for density is then made in a density gradient column; reported as gms/cc. |
| Melt Index (MI), $I_2$ | ASTM D-1238 - (190° C./2160 g) Measured at 190° C. - reported as grams per 10 minutes. |
| High Load Melt Index (HLMI), $I_{21}$ or FI | ASTM D-1238 - (190° C./21600 g) Measured at 10 times the weight used in the melt index test above. |

| | |
|---|---|
| Melt Flow Ratio (MFR) | $\dfrac{I_{21}}{I_2}$ |

EXAMPLES

The following examples C and D are in examples of U.S. patent application Ser. No. 07/997,421, filed Dec. 28, 1992.

Example C

This catalyst was prepared in two stages.

(Step I) 495 grams of Davison grade 955 silica, previously calcined with dry nitrogen for about 12 hours at 600° C., was added to a 2 gallon stainless steel autoclave under a slow nitrogen purge to eliminate oxygen and moisture from the catalyst preparation vessel. Then, 4.0 liters of dry isopentane (IC5) was added to the autoclave and the silica/IC5 were slurried at about 100 rpm and the internal temperature was maintained at about 55°–60° C. Next, 469 ml of a 0.76 molar solution of dibutylmagnesium in heptane was added to the silica/IC5 slurry and stirring was continued for 60 minutes. Next, 39.1 ml of neat titanium tetrachloride was diluted with about 40 ml of IC5 and this solution was added to the autoclave and stirring was continued for 60 minutes. Finally, the solvents were removed with a nitrogen purge through a vent line and 497 grams of a brown free-flowing powder were obtained. Ti found was 2.62 wt %; Mg found was 1.33 wt % and Ti/Mg molar ratio was 1.0.

(Step II) 492 grams of the product of the first stage was added to a 1.6 gallon glass catalyst preparation vessel fitted with a temperature jacket and an internal stirrer. The product of the first stage had an estimated pore volume of 1.5 cc/g (i.e. 738 cc of pore volume). Then into a stainless steel Hoke bomb was added 13.93 grams of $(BuCp)_2ZrCl_2$ (34.4 mmol Zr) and 717.5 ml of a methylalumoxane solution (3,444 mmol of Al) in toluene (4.8 Molar). Note: The total volume of the methylalumoxane/toluene solution is equal to or less than the total pore volume of the product of the first step. Next, the toluene solution containing the methylalumoxane and the zirconium compound were mixed and then the solution was added to the product of the first step in approximately 5 ml aliquots over 90 minutes; (during this time, the product of the first step remains completely dry and always consists of a free-flowing powder). Finally, nitrogen is purged through the glass vessel for about 5 hours with the jacket temperature at about 45° C. Yield: 877 grams of a free-flowing powder. Ti found was 1.85 wt %; Zr found was 0.30 wt %.

Example C-1

This catalyst was also prepared in a two step process as described in EXAMPLE C. Step I was the same as EXAMPLE C, but in Step II we used 406 grams of reaction product from the first step, 826 mls of methylalumoxane solution and 15.6 grams of $(BuCp)_2ZrCl_2$ were used. Yield: 568 grams of a brown free-flowing powder. Ti found was 1.58 wt % Zr found was 0.45 wt %.

Example C-2

This catalyst was also prepared in a two step process as described in EXAMPLE C. Step I was the same as EXAMPLE C, but in Step II we used 506 grams of reaction product from the first step, 921 mls of methylalumoxane solution and 17.5 grams of $(BuCp)_2ZrCl_2$ were used. Yield: 866 grams of a brown free-flowing powder. Ti found was 1.64 wt %, Zr found was 0.43 wt %.

Example D

The catalyst described in Example C was examined in a pilot plant fluid bed gas phase reactor under the following conditions:

| | |
|---|---|
| ethylene partial pressure | 180 psi |
| hydrogen/ethylene | 0.005–0.008 |
| hexene/ethylene | 0.015 |
| reactor temperature | 95° C. |
| TMA | 200 ppm |

The resin prepared at a productivity of about 1400 g polymer/g catalyst had the following characteristics:

| | |
|---|---|
| average particle size | 0.017 inches |
| resin metal (Ti) content | 13.0 ppm |
| HLMI (I21) | 5.3 |
| MFR (I21/I2.16) | 113 |
| Density | 0.949 g/cc |

Properties of films of the product of Example D are compared to the commercially produced product OxyChem L5005 in the following table.

| Sample | Ti/Zr | OxyChem L5005 |
|---|---|---|
| $I_{21}$ | 5.3 | 8.0 |
| MFR | 113 | 160 |
| Density | 0.949 | 0.950 |
| Throughput, lb/hr | 98 | 120 |
| Melt Pressure (at 120 lb/hr), psi | 7550 | 6450 |
| FQR | 15 | 15 |
| Dart Drop, 1 mil, g | 565 | 325 |
| 0.5 mil, g | 410 | 420 |
| MD Elmendorf Tear, 0.5 mil. g/mil | 37 | 25 |

The GPC results show that the Example D bimodal product has a high molecular weight component with higher molecular weight than that produced in the tandem two reactor process. The film of Example D is substantially reduced in, if not free of, gel content. The film of the Example D product has improved dart impact [as measured by dart drop ASTM D1709 (Method A)] and Elmendorf Tear (ASTM- 1992).

Example E

A catalyst similar to that described in Example C with a higher MAO loading (9.5 mmol Al/g silica at an Al/Zr ratio of 100) was examined in a pilot plant fluid bed gas phase reactor under the following conditions:

| | |
|---|---|
| ethylene partial pressure | 185 psi |
| hydrogen/ethylene ratio | .007 |
| hexene/ethylene ratio | .004 |
| reactor temperature | 95° C. |
| TMA | 263 ppm |

The resin prepared had the following characteristics:

| | |
|---|---|
| average particle size | 0.017 in. |
| resin Ti content | 12 ppm |
| HLMI ($I_{21}$) | 26 g/10 min |
| MFR ($I_{21}/I_2$) | 259 g/10 min |

| | | |
|---|---|---|
| Density | 0.960 g/cc | |

Resin was fabricated into 28 g bottles on a reciprocating Improved blow molding machine. Properties of the resin and bottles of the product of Example E are compared to the commercially produced product USI 734 in the following table.

| Sample | Invention Product Ti/Zr | Commercial Product USI LR734 |
|---|---|---|
| $I_{21}$ | 26 | 34 |
| MFR | 259 | 110 |
| Density | .960 | .954 |
| Bent Strip ESCR*, F50, hrs (10% Igepal with slit) | 128 | <21 |
| Net Bottle Weight, g | 26.3 | 27.7 |
| Top Pinch Width, in | 2.177 | 2.188 |

*Bent Strip ESCR ASTM D-1693

The above results show that the invention product has a significantly improved ESCR at higher stiffness (density) compared to a commercial blow molding product at comparable processability (swell characteristics).

Example 1

This example illustrates the superior inter-particle homogeneity of the in-situ blends produced by the bimetallic catalyst over that of the tandem reactor resins.

Presently, commercial samples of HDPE with a bimodal MWD are produced in a tandem reactor process. In that process, two reactors are run in series and the catalyst is exposed to ethylene polymerization conditions in one reactor, and the resulting polymer-catalyst particles are transferred to a second reactor for additional polymerization. One of the main process differences in the two different reactors, is that the amount of hydrogen is different in the two different reactors. Relatively lower molecular weight product is produced in the reactor containing more hydrogen, because the hydrogen acts as a chain transfer agent; whereas relatively higher molecular weight product is produced in the reactor containing lesser relative amounts of hydrogen.

The reactor samples were sieved to segregate them as a function of particle size. The individual sieved fractions were analyzed by GPC to determine their molecular weight distribution. The results are tabulated below:

| Resin | Mw* | Mw/Mn xx |
|---|---|---|
| xxxxTandem Reactor Process | | |
| #18 sieve | 277600 | 18.30 |
| #60 sieve | 236000 | 18.9 |
| #120 sieve | 222700 | 18.0 |
| #170 sieve | 196000 | 17.8 |
| xxxBimetallic Catalyst C-2 | | |
| #18 sieve | 276800 | 35.8 |
| #35 sieve | 269200 | 33.6 |
| #60 sieve | 290700 | 32.7 |
| #120 sieve | 267400 | 33.0 |
| #200 sieve | 285200 | 37.5 |

*Mw is weight average molecular weight measured by GPC.
xxMn is number average molecular weight measured by GPC.
xxxCatalyst C-2 (above)

| Resin | Mw* | Mw/Mn xx |
|---|---|---| xxxxThis process used a catalyst which was a silica-supported Ti/Mg complex which was not pre-reduced or partially activated with tri-n-hexylaluminum. The catalyst precursor contained 1.13 wt. % Ti, 1.95 wt. % Mg, 8.22 wt. % Cl, 15.4 wt. % THF, and 1.41 wt.% Al.

The particles of product are characterized by weight average particle diameter ranging from 0.01 inches to 0.04 inches, but can range from 0.015 to 0.022 inches.

For the bimetallic catalyst resin particles, the Mw of the highest molecular weight sieved fraction is only 8.7 percent higher than the Mw of the lowest molecular weight fraction. On the other hand, for the tandem resin, the highest molecular weight fraction has a Mw which is 41.6 percent higher than the Mw of the lowest molecular weight fraction. In addition, unlike the bimetallic resins, the molecular weight of the tandem resin fractions decreases with decreasing particle size. Thus, the tandem resin particles are more heterogeneous than the corresponding bimetallic (Ti/Zr) catalyzed resin particles.

The differences in the heterogeneity of the two bimodal products is also reflected in the appearance of the films produced from these resins. The film quality rating (FQR) of the Ti/Zr film was 10 while the tandem resin film sample had a FQR of 50. The higher FQR denotes higher gel levels and thus poorer film appearance. The low FQR of the Ti/Zr film is truly impressive considering the fact that it has a significantly broader MWD (Mw/Mn of 36 versus 18) with more distinct bimodality.

We also studied particle heterogeneity of the bimodal HMW-HDPE resin produced with the Ti/Zr catalyst (of U.S. Pat. No. 5,032,562 assigned to Mobil) with the MAO cofed externally. We characterized the MWD of the individual sieved fractions of a sample which would be similar to the one described in Example 4 of that patent. The results are as follows:

| Sieve # | Mw | Mw/Mn |
|---|---|---|
| 18 | 327811 | 8.17 |
| 60 | 242030 | 14.49 |
| 120 | 97412 | 12.88 |
| 200 | 77986 | 10.52 |
| pan (>200 sieve) | 11907 | 1.8 |

This analysis shows that the particles made by the MAO cofeed process are very heterogeneous. In Example 1, the resin made from a Ti/Zr containing the preactivated Zr had only a 9 percent difference between the Mw of the lowest molecular weight fraction and the Mw of the highest molecular weight fraction. In contrast, the result with product of U.S. Pat. No. 5,032,562 shows that the Mw of the highest molecular weight fraction is almost 30 times the Mw of the lowest molecular weight fraction. Also, there is a wide variation in the Mw/Mn of the fractions: 1.8–14.49.

Example 2

This example demonstrates the broad range of products that are possible with the Ti/Zr catalyst system. By proper selection of the-catalyst formulation and reactor conditions, we were able to produce resins covering a broad range of FI, MFR and density. These resins also represented a broad range of component weight fractions and molecular weights (FI, MI). The following equations illustrate the versatility of the technology:

| | | | | |
|---|---|---|---|---|
| 1. Den = 0.944 + 0.19($H_2/C_2$) −0.25($C_6/C_2$) +0.00027(T-90) +.0063 ($log_{10}$FI) | | | | |
| T-value | 1.9 | 7.1 | 3.1 | |
| R square = 89 | | | | |
| 2. Ln FI-HMW = −1.6 + 75($H_2/C_2$) + 0.063(T-90) | | | | |
| T-value | | 7.3 | | 6.8 |
| R square = 92 | | | | |
| 3. Ln MI-LMW = 7.5 + 166($H_2/C_2$) − 41($C_6/C_2$) + 0.03(T-90) | | | | |
| T-value | | 11.9 | 10.3 | 1.8 |
| R square = 98 | | | | |
| 4. XHMW = 0.979 − 2.2($H_2/C_2$) −2.4($C_6/C_2$) +0.008(T-90) −0.039(PZ*) | | | | |
| T-value | 2.3 | 6.1 | 4.4 | 4.3 |
| R square = 96 | | | | |

*PZ = mmol (Al)/g precursor; at an Al/Zr ratio of 100.

Using the appropriate control variables, it is possible to make resins with a HMW weight fraction range of 0.1–0.8, a HMW FI range of 0.01 to 4 and a LMW MI range of 20 to 20,000.

A brief description of the mathematical technique that is used to estimate the composition (Molecular weight and weight fraction) of the bimodal molecular weight distribution produced by the bimetallic catalyst appears in Computer Applications in Applied Polymer Science, ACS Symposium Series, 197, T. Provder, 45, 1982, which is expressly incorporated herein by reference.

Example 3

In this example, we compare the level of unsaturation encountered in the Ti/Zr resin with that of typical tandem resin. These measurements were made on granular resins with standard FTIR spectroscopy techniques.

| Sample | Total Unsaturation Level, per 1000 carbons |
|---|---|
| Ti/Zr | .92 |
| Tandem | .18 |

Example 4

This example illustrates the narrow MWD of the LMW component in the bimodal product produced by the Ti/Zr catalyst. The attached GPC curve clearly shows (by its relative sharpness) that the LMW peak for the bimodal Ti/Zr resin is significantly narrower in MWD when compared to the LMW MWD of a typical tandem resin. The MWD of the LMW component in the Ti/Zr catalyzed resin is expected to be narrower in distribution because it is made by the Zr catalyst component. The metallocene Zr catalyst is known to produce resins with substantially narrower MWD compared to a typical Ziegler Natta based Ti catalyst. The latter are used in producing both the HMW and LMW components in the tandem process. The MWD of the LMW component can also be deduced by deconvoluting the bimodal GPC curve into its component. With this technique, the molecular weights and molecular weight distribution of each component can be estimated. This technique also shows the LMW component to be narrower in MWD for the Ti/Zr catalyzed resins. The LMW component in Ti/Zr catalyzed resins has Mw/Mn range of 2–3.5, while the LMW component in a typical tandem resin has Mw/Mn range of 4–6.

Thus it is apparent that there has been provided, in accordance with the invention, a process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A product in the form of particles, characterized by a weight average particle diameter in the range of 0.01 to 0.04 inches,
   each particle comprising a resin which is selected from the group consisting of polymer of ethylene, copolymer of ethylene and admixtures thereof,
   wherein the resin has a density of 0.89 to 0.97; has a Mw/Mn of 2.5 to 60, and has FI of 1 to 100,
   wherein said resin comprises two components of different molecular weight wherein one of said two components is a high molecular weight component (HMW) and wherein another of said two components is a low molecular weight component (LMW) with a molecular weight less than that of HMW, wherein said resin is characterized by Mw and Mw/Mn;
   wherein the HMW component has a calculated FI of 0.005 to 50 and the LMW component has calculated MI of 0.1 to 20,000 and calculated $M_w/M_n$ of 2 to 5; and
   wherein the $M_w$ and the $M_w/M_n$ of said resin in said particles is substantially constant over said range of weight average particle diameter;
   wherein the blend is formed in situ in a single reactor by a catalyst comprising a metallocene transition metal.

2. The product of claim 1, wherein the resin has a density which ranges from 0.930 to 0.970 g/cc.

3. The product of claim 1, wherein the resin has a density which ranges from 0.940 to 0.970.

4. The product of claim 1, wherein the resin has a density which ranges from 0.930 to 0.940.

5. The product of claim 1, wherein the Mw/Mn of the resin ranges from 10 to 40.

6. The product of claim 1, wherein the Mw/Mn of the resin ranges from 15 to 30.

7. The product of claim 1, wherein the polymer or copolymer has a total unsaturation measured by IR which ranges from 0.1 to 3.0 per 1000 carbon atoms.

8. The product of claim 1, which is crosslinkable.

9. The product of claim 1, wherein the calculated molecular weight distribution $M_w/M_n$ of the LMW fraction ranges from 2 to 3.5.

10. The product of claim 1 wherein the calculated molecular weight distribution $M_w/M_n$ of the LMW fraction ranges from 2 to 2.5.

11. The product of claim 1 which is a homopolymer of ethylene.

12. The product of claim 1 which is a copolymer of ethylene and an alpha olefin of 3 to 10 carbon atoms.

13. The product of claim 1 which is a copolymer of ethylene and an alpha olefin of 4 to 8 carbon atoms.

14. The product of claim 1 which is a copolymer of ethylene and an alpha olefin which is selected from the group consisting of propylene, 1-butene, 1-hexene, 1-octene, 4-methylpentene and admixtures thereof.

15. The product of claim 1 which is a copolymer of ethylene and 1-hexene.

16. The product of claim 12, wherein the copolymer comprises 0 to 20 weight percent of alpha olefin.

17. The product of claim 5 wherein the calculated molecular weight distribution of the LMW fraction ranges from 2 to 2.5

18. The product of claim 6 wherein the calculated molecular weight distribution of the LMW fraction ranges from 2 to 2.5.

19. The product of claim 1 wherein the resin contains 0.1 to 10 ppm of said metallocene transition metal.

20. The product of claim 19, wherein the resin further comprises 1 to 30 ppm titanium.

21. The product of claim 1, wherein the resin has a density in the range of 0.918 to 0.929.

22. A film formed of the product of claim 1 having FQR of less than 50.

23. An article blow molded from the product of claim 1.

* * * * *